Nov. 6, 1951     W. R. NEW     2,574,190
TURBINE APPARATUS
Filed July 30, 1946
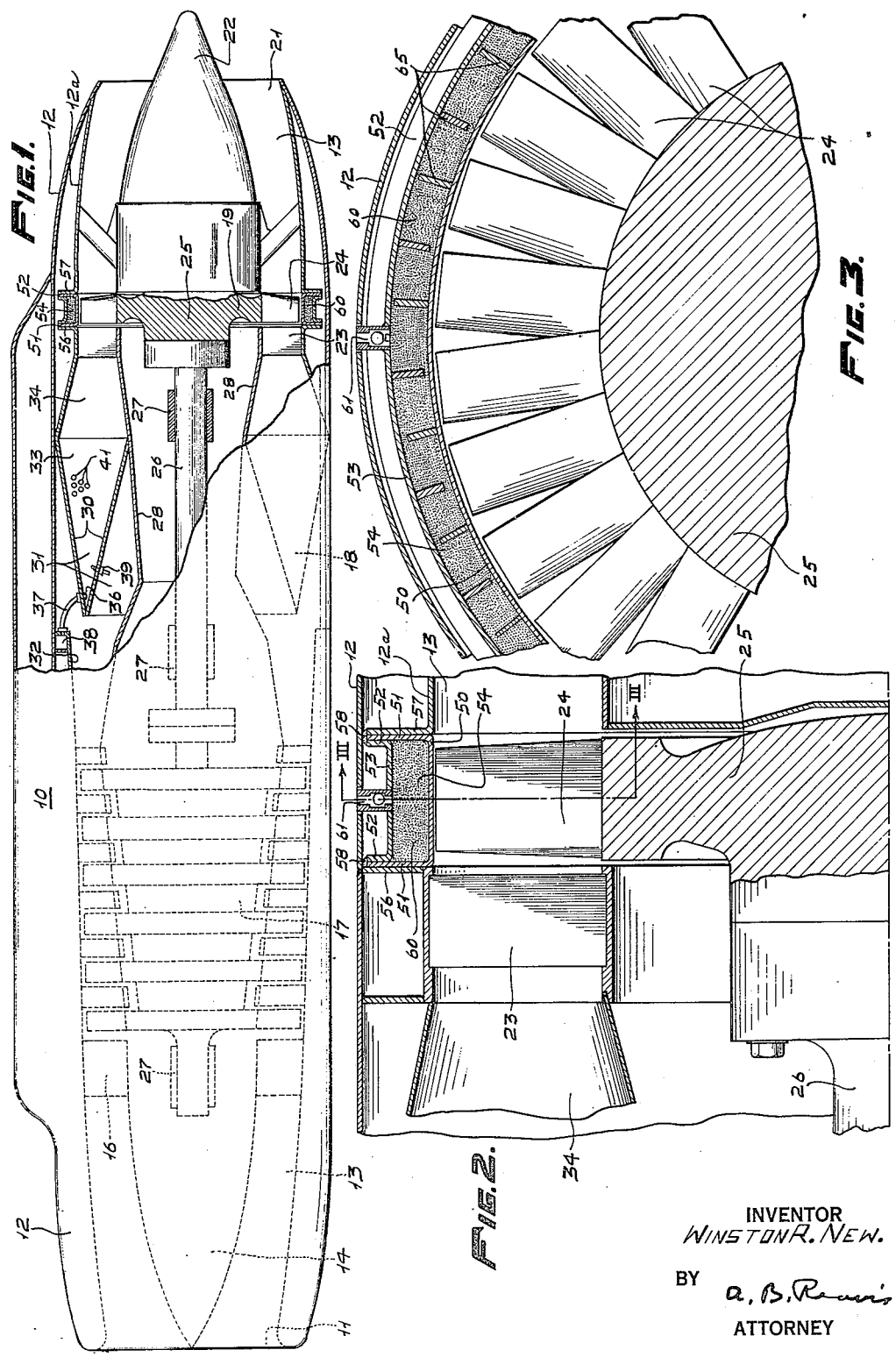
INVENTOR
*WINSTON R. NEW.*
BY *a. B. Reavis*
ATTORNEY Patented Nov. 6, 1951

2,574,190

UNITED STATES PATENT OFFICE 2,574,190

TURBINE APPARATUS

Winston R. New, Springfield, Pa., assignor, by mesne assignments, to the United States of America as represented by the Secretary of the Navy Application July 30, 1946, Serial No. 687,178

2 Claims. (Cl. 253—39.15)

This invention relates to casing structures, more particularly to casing structures subject to distortion resulting from temperature changes, and has for an object to provide improved construction of this character.

The invention has particular merit in apparatus involving relatively lightweight casings of insufficient mass and thermal capacity to sustain nonuniform or unsymmetrical heating or cooling without warping or deformation thereof.

The present invention, although not limited thereto, is particularly adapted for use with a gas turbine power plant of the type employed on aircraft to drive the propeller or an electric generator or to supply motive fluid for jet propulsion of the aircraft. Such a plant preferably comprises a tubular casing having mounted axially therein a compressor adjacent the forward or inlet end, a turbine adjacent the rearward or discharge end, and combustion apparatus located between the compressor and turbine for heating the compressed air and which discharges the hot gases at a suitable temperature and pressure to the turbine. The partially expanded gases on leaving the turbine are discharged through a nozzle provided at the rear of the casing to aid in propelling the aircraft or be the sole means therefor.

Parts of aviation gas turbine power plants of the character just described, and, for that matter, of aviation engines of all types, are necessarily made as light as is consistent with the function they must perform. The cylinder elements of aviation gas turbines required to sustain an internal pressure of at the most, say, ten atmospheres, and, in the past, frequently one to five atmospheres, cannot be the heavy-walled cast or fabricated structures so commonly found in land and even in marine steam turbines. Instead, a thin-walled structure with lateral bulkheads and local stiffeners must be used.

In the high-temperature portion of such gas turbine power plants, one recurrent deficiency of this seemingly so necessary stator construction is that its thermal capacity compared with the cooperating rotor element is exceedingly small. Rapid heating or cooling of the light stator is almost invariably non-uniform to a sufficient degree to cause distortion that may be large compared with the desired close running clearance essential to high internal efficiency.

To overcome this problem by giving the desired high thermal capacity to light stator or casing elements at a minimum weight increase, the present invention proposes to enshroud the surface that must not distort with a layer of one of the numerous heat-treating salts that will become molten, but not vaporize, at the operating temperature of the casing wall.

The latent heat of fusion of the recommended salts is many times the specific heat of metals, and the salts are lighter in weight than most metals. The salts are stable and many of them will not chemically attack metals.

Considering, for example, individual compounds like potassium hydroxide, which has a fusion point of 716° Fahrenheit and eutectic combinations, like barium, calcium, and sodium chloride, which has a fusion point of 806° Fahrenheit, almost any desired fusion temperature from about 300 to 2000 degrees F. can be obtained. The wall structure enclosing the salt can be light since no internal pressure will be developed and the cavity can be suitably vented to atmosphere without appreciable loss of its contents by vaporization.

Accordingly, another object of the invention is to provide means for increasing the thermal capacity of lightweight casings at critical regions therein.

A further object of the invention is to provide for increasing the thermal capacity of lightweight casings at critical regions thereof by enshrouding the casing at such regions with a layer of a heat-treating salt.

These and other objects are effected by the invention as will be apparent from the following description and claims taken in connection with the accompanying drawings, forming a part of this application, in which:

Fig. 1 is a side elevational view of a gas turbine power plant incorporating the present invention, a portion of the outer casing and part of the inner structure being broken away to better illustrate the novel features;

Fig. 2 is an enlarged fragmentary view of a portion of the structure illustrated in Fig. 1; and Fig. 3 is a transverse sectional view, taken along the line III—III of Fig. 2, looking in the direction indicated by the arrows.

The power plant shown in Fig. 1, and indicated in its entirety by the reference character 10, is adapted to be mounted in or on the fuselage or wing of an aircraft, with the left or intake end 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial-flow compressor 17, combustion apparatus generally indicated 18, a turbine 19 which drives the compressor, and a nozzle 21 defined by the casing 12a and by a tailpiece 22, the latter being mounted concentrically in the casing and cooperating with the latter to provide the propulsion nozzle.

Air enters at the intake 11 and flows substantially straight through the plant, passing through the compressor 17, where its pressure is raised, and into combustion apparatus 18, where it is heated. The hot gases, comprising the products of combustion and excess air heated by the combustion, on leaving the combustion apparatus are directed by suitable guide vanes or nozzles 23 against the blades 24 of the turbine disc 25 and then are discharged through the propulsion nozzle 21 to propel the aircraft.

By reference to Fig. 1, it will be noted that the compressor and turbine rotors are interconnected by means of a shaft 26 supported by suitable bearings 27 and enclosed by an inner wall structure, generally indicated 28, which protects that shaft and bearings from high temperatures and also defines a portion of the annular air flow passage 13 in which the combustion apparatus 18 is disposed.

To maintain the combustion apparatus and the outer casing structure of small maximum diameter, the combustion apparatus 18 is divided by wall structure 30 into an air space or spaces 31 open to the discharge end of a diffuser passage 32 leading from the compressor, and which overlap a burner space or spaces 33 open to a passage 34 leading to the turbine guide vanes 23. Atomized fuel is supplied to the forward end of the burner space or spaces through nozzles 36 supplied by conduits 37 from the fuel manifold 38. The burner space is likewise provided with suitable ignition means, as at 39. The dividing wall structure 30 has openings 41 therein to provide for entry to the burner space of air under pressure from the overlapping air spaces, the entering air supporting combustion of fuel and diminishing the temperature of the hot products of combustion to a level suitable for operation of the turbine.

The present invention is not limited to the specific details or arrangement of the structure thus far described, but is primarily concerned with that portion of the wall 12a which defines the outer boundary of the annular air duct or passage 13 in the region of the turbine blades 24.

As seen in Fig. 2, the portion 50 of the casing inner wall 12a, which is radially aligned with the tips of the turbine blades 24 and defines the outer boundary of the annular flow passage 13 where it passes the turbine blades, is disposed in very close proximity to the blade tips. Preferably, the spacing of this wall 50 from the blade tips in only a few thousandths of an inch, and any rapid heating or cooling of the light wall results in distortion thereof with consequent rubbing of the blade tips thereon, or even actual freezing of the turbine by engagement of the wall with the blade tips.

According to the present invention, the wall 50 is provided with radial outwardly-projecting flanges 51 cooperating with the channel section 53 to define an annular chamber 54 surrounding the wall 50.

The flanges 51 and 52 are secured to each other, for example, by resistance welding and to adjacent radial members 56 and 57 by welding, as at 58, or by bolting.

The annular space 54 is filled with any one or a combination of the heat-treating salts, as at 60, that become molten, but do not vaporize, at the temperature which the wall 50 will reach when the power plant 10 is in operation.

Upon starting of the power plant, the salts 60 rise in temperature and gradually fuse, providing thereby a circumferentially distributed heat sink of capacity adequate to diminish greatly the temperature quadrants responsible for distortion of the wall 50. When the power plant is shut down, the molten salts 60 operate as a heat source to keep the wall 50 from cooling more rapidly than the rotor or non-uniformly with resultant deformation and probable seizure of the turbine. Obviously, the blades 24 and disc 25 constitute such a large mass that they absorb and give up heat much more slowly than the thin wall 50, if the latter did not have the shrouding of salt, a small weight of which is so effective since its heat of fusion is utilized.

To insure that no internal pressure is developed within the annular space 54 by heating of the salt, the chamber may be provided with suitable vent means, shown at 61, which will permit escape of evaporated moisture but prevent loss of salt by accidental spillage.

Radial partitions 65 may be provided to prevent circumferential shifting of the salts upon successive melting and solidification.

While the invention has been shown in but one form, it will be obvious to those skilled in the art that it is not so limited, but is susceptible of various changes and modifications without departing from the spirit thereof.

What is claimed is:

1. In an aviation gas turbine power plant, a thin-walled casing having small thermal capacity per unit of area; a turbine rotor in said casing mounted for close running clearance relative thereto at a limited region thereof, said rotor having large thermal capacity per unit of area compared to said casing, and said casing and rotor being subject to temperature changes causing expansion and contraction thereof; wall structure associated with said casing at the region thereof of close running clearance and defining therewith an annular chamber encompassing said region of close running clearance; and a mass of fusible heat-treating salt disposed in said chamber and adapted to fuse during normal operation of the turbine and to operate as a heat source, when the power plant is being shut down, to retain the casing at the region of close running clearance at a temperature close to that of the turbine rotor.

2. In an aviation gas turbine power plant, a turbine rotor; a thin-walled casing surrounding said rotor and defining therewith an annular flow path for high temperature motive fluid; a circumferentially-extending row of blades carried by the rotor and extending across said flow path, the tips of said blades having close running clearance with respect to a portion of the casing radially aligned therewith; wall structure associated with said casing portion exteriorly thereof and defining therewith an annular chamber encompassing said casing portion; and a body of fusible heat-treating salt in said chamber and adapted to fuse during normal operation of the turbine and, when the power plant is being shut down, to operate as a heat source for retaining said casing portion at a temperature close to that of the turbine rotor, whereby seizing of the rotor by the casing portion or rubbing of the blade tips thereagainst is prevented.

WINSTON R. NEW.

REFERENCES CITED

The following references are of record in the file of this patent:

UNITED STATES PATENTS

| Number | Name | Date |
|---|---|---|
| 1,294,416 | Dady | Feb. 18, 1919 |
| 1,699,273 | Bissell | Jan. 15, 1929 |
| 1,823,454 | Jardine | Sept. 15, 1931 |
| 2,157,610 | Jardine | May 9, 1939 |
| 2,407,164 | Kimball | Sept. 3, 1946 |
| 2,427,845 | Forsyth | Sept. 23, 1947 |

FOREIGN PATENTS

| Number | Country | Date |
|---|---|---|
| 907,059 | France | June 11, 1945 |